United States Patent
Jiang et al.

(10) Patent No.: US 10,158,622 B2
(45) Date of Patent: Dec. 18, 2018

(54) SYSTEM AND METHOD FOR A GENERIC SINGLE SIGN-ON FUNCTION

(71) Applicant: Samsung Electronics Co., Ltd., Gyeonggi-do (KR)

(72) Inventors: Haiqing Jiang, San Jose, CA (US); Varun Shimoga Prakash, Milpitas, CA (US); Xiao Liu, Sunnyvale, CA (US); Pavan Kumar Emani, Sunnyvale, CA (US); Xiao Zhang, Syracuse, NY (US); Xinwen Zhang, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 14/978,481

(22) Filed: Dec. 22, 2015

(65) Prior Publication Data
US 2016/0255075 A1  Sep. 1, 2016

Related U.S. Application Data

(60) Provisional application No. 62/126,079, filed on Feb. 27, 2015.

(51) Int. Cl.
*G06F 21/00* (2013.01)
*H04L 29/06* (2006.01)
*G06F 21/41* (2013.01)

(52) U.S. Cl.
CPC .......... *H04L 63/0815* (2013.01); *G06F 21/41* (2013.01); *H04L 63/101* (2013.01)

(58) Field of Classification Search
CPC .......... G06F 21/41; G06F 21/84; G06F 21/44; H04L 63/0815; H04L 63/101
See application file for complete search history.

(56) References Cited

U.S. PATENT DOCUMENTS

| | | | |
|---|---|---|---|
| 2010/0043065 A1* | 2/2010 | Bray | G06F 21/41 726/8 |
| 2012/0011578 A1 | 1/2012 | Hinton et al. | |
| 2012/0291114 A1* | 11/2012 | Poliashenko | G06F 21/41 726/8 |
| 2014/0090037 A1 | 3/2014 | Singh | |

(Continued)

FOREIGN PATENT DOCUMENTS

CN  102904895  1/2013

OTHER PUBLICATIONS

Extended European Search Report issued for EP 16157706.9 dated Apr. 28, 2016, 9 pgs.

*Primary Examiner* — Ghazal B Shehni

(57) ABSTRACT

A system and method are presented for providing generic single sign-on in an electronic device. Information is received that identifies one or more applications and associated identity authenticators and a whitelist of the identified applications and authenticators is created. A request for an access token is received from a requesting application. If the requesting application is listed in the whitelist, an authenticator associated with the requesting application is determined and a request for an access token is sent to the associated authenticator. In response to the request, an access token is received from the authenticator and the access token is sent to the requesting application. If the requesting application is not listed in the whitelist, a predefined response message is sent to the requesting application.

18 Claims, 3 Drawing Sheets

(56) References Cited

U.S. PATENT DOCUMENTS

| | | | |
|---|---|---|---|
| 2014/0281548 A1* | 9/2014 | Boyer | H04L 63/061 713/171 |
| 2014/0282983 A1* | 9/2014 | Ju | H04W 12/06 726/8 |
| 2014/0298420 A1* | 10/2014 | Barton | H04L 63/10 726/4 |
| 2015/0040246 A1 | 2/2015 | Yuen et al. | |

* cited by examiner

SYSTEM AND METHOD FOR A GENERIC SINGLE SIGN-ON FUNCTION

TECHNICAL FIELD

The present disclosure relates to system access control. More particularly, the present disclosure relates to a system and method for a generic single sign-on function.

BACKGROUND

Some application frameworks provide an account manager feature on an electronic device. The framework may consist of a system service and third party authenticators that may be bound by the system service. The account manager may provide access to a centralized registry of accounts belonging to a user. The user provides his or her credentials (e.g., username and password) once per account granting applications on the electronic device, in order to obtain online resources after verifying the identity of the user with the account-managing authenticator. However, such account managers are more suited to consumer level implementations and typically cannot be applied effectively in an enterprise scenario.

The above information is presented as background information only to assist with an understanding of the present disclosure. No determination has been made, and no assertion is made, as to whether any of the above might be applicable as prior art with regard to the present disclosure.

SUMMARY

In a first embodiment, a method for providing generic single sign-on in an electronic device includes receiving information that identifies one or more applications and associated identity authenticators and creating a whitelist of the identified applications and authenticators. The method also includes receiving from a requesting application a request for an access token. The method further includes, if the requesting application is listed in the whitelist, determining an authenticator associated with the requesting application and sending a request for an access token to the associated authenticator. The method also includes, in response to the request, receiving an access token from the authenticator and sending the access token to the requesting application.

In a second embodiment, an electronic device providing generic single sign-on functionality includes a memory comprising a plurality of applications and a processor configured to execute one or more of the plurality of applications in the memory. The applications in the memory include an application interface, an agent interface, an authenticator interface, and a system service module. The application interface exchanges one or more messages with a plurality of applications. The agent interface receives one or more messages from an agent. The authenticator interface exchanges one or more messages with a plurality of identity authenticators. The system service module is configured to receive messages via the agent interface, each message identifying applications and associated identity authenticators and create a whitelist of the applications and associated authenticators. The system service module is also configured to receive an access token request message from a requesting application via the application interface and determine whether the requesting application is listed in the whitelist. The system service module is further configured, if the requesting application is not listed in the whitelist, to send a predefined response message to the requesting application via the application interface.

In a third embodiment, a non-transitory computer readable medium is configured to control a processor to perform the method of the first embodiment for providing generic single sign-on in an electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
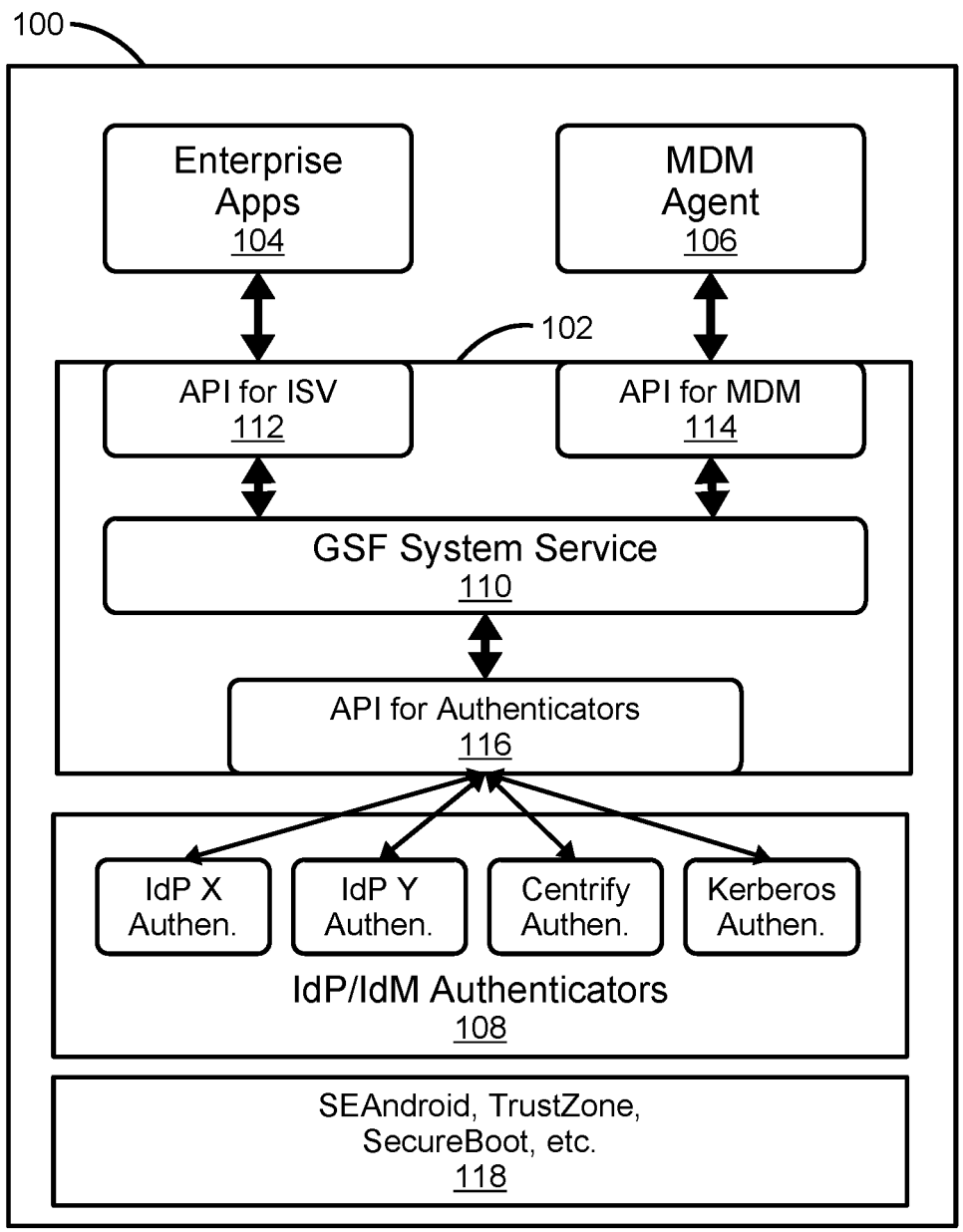
FIG. 1 illustrates single sign-on framework software elements of an electronic device according to the present disclosure.
Figure 2:
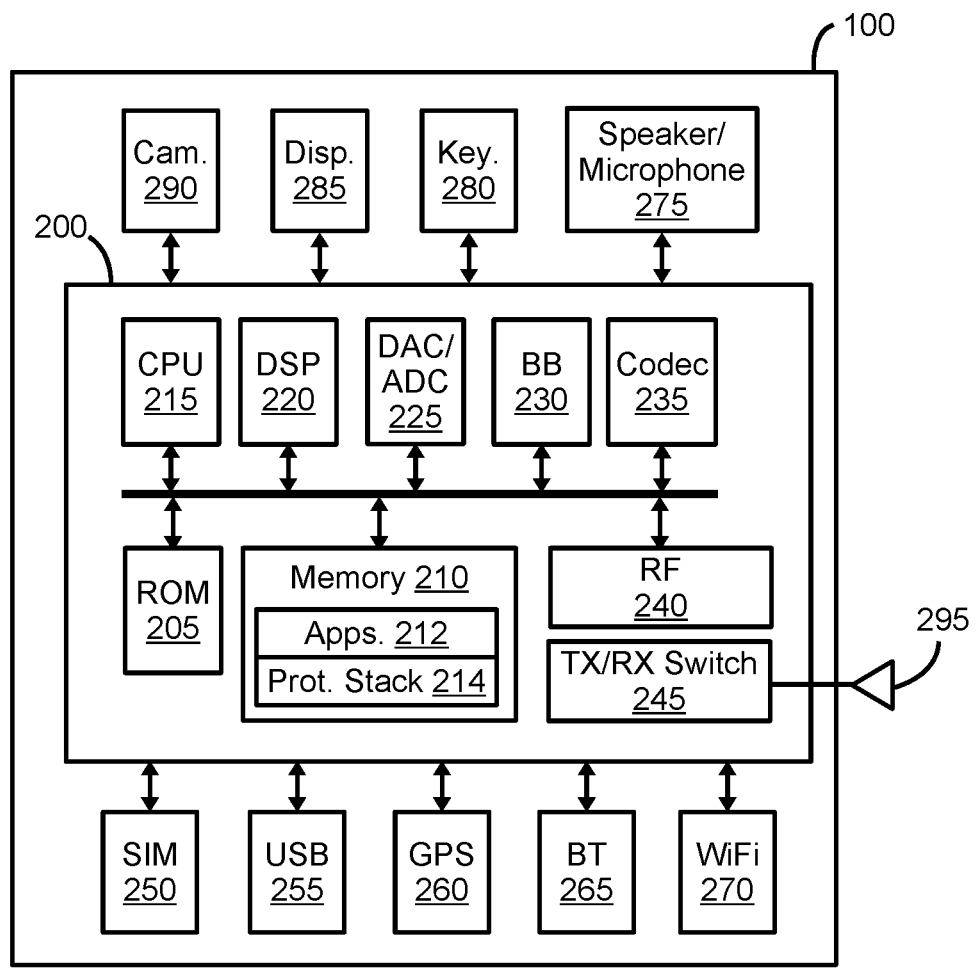
FIG. 2 illustrates hardware elements of an electronic device for use in a single sign-on system according to the disclosure.
Figure 3:
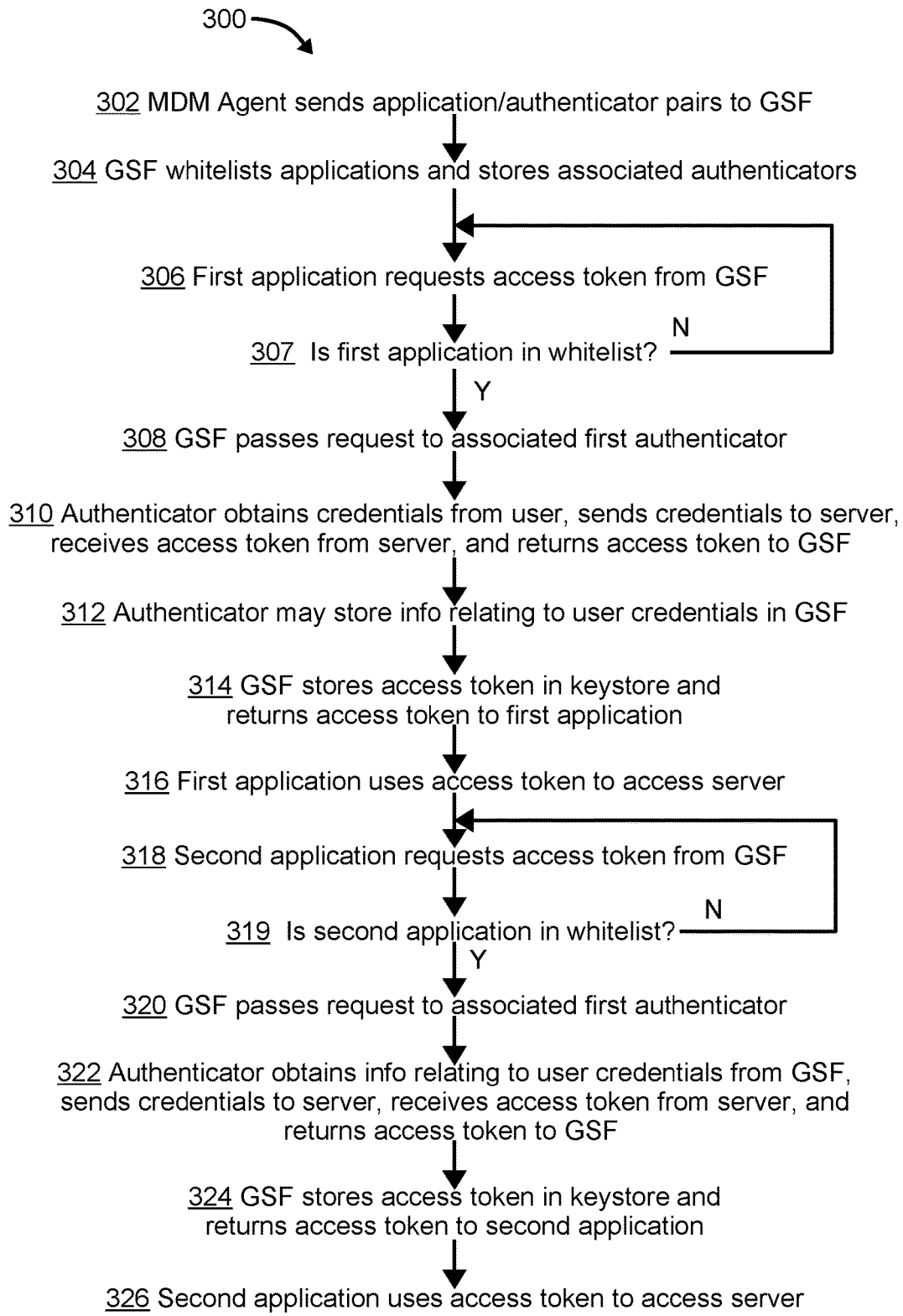
FIG. 3 illustrates a process for a single sign-on function according to the disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method for a generic single sign-on function.

The detailed descriptions with reference to the accompanying drawings are provided to assist in the comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., navel navigator device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing device.

Single Sign-On (SSO) provides access control for multiple related, but independent, software systems. Conversely, single sign-off is the property whereby a single action of signing out terminates access to multiple software systems. SSO and single sign-off have many advantages in an enterprise scenario.

The generic single sign-on (GenericSSO) framework (GSF) of the present disclosure is intended to fulfill many objectives of the single sign-on function in an enterprise scenario. With the GSF, an electronic device is able to support multiple single sign-on (SSO) service providers. Firmware updates are no longer needed when a new SSO solution is added to the electronic device. The SSO solution of the GSF is fully Plug-and-Play. The single sign-on is completely controlled by a Mobile Device Management (MDM) administrator or other device management administrator and requires only a single version of a client application to call GenericSSO-related application programming interfaces (APIs) to obtain access tokens from a wide range of SSO service providers. An MDM agent may control the addition of accounts or management of authenticators on the device.

The GSF of the present disclosure provides a flexible, seamless, MDM-controlled single sign-on feature. The framework provides efficient APIs for MDM agents to control aspects of single sign-on such as SSO service providers, whitelisted applications and token management. The framework also provides interfaces to third party SSO service providers and client applications that need authentication tokens to obtain web resources. The framework is also compatible with third-party access management technologies including, but not limited to, OAuth, SAML, OpenID and the like.

Where a plurality of users are collected together under the administration of an enterprise (e.g., a company, a university, a family, etc.), an enterprise administrator may desire to institute consistent policies for access security amongst all users in the enterprise. For example, the enterprise administrator may require that all enterprise users utilize a designated cloud-based file storage server, where the file storage server uses a first designated third-party access management technology. The enterprise administrator may further require that all enterprise users utilize a designated email server, where the email server uses a second designated third-party access management technology. The enterprise administrator may still further require that all enterprise users utilize a designated time-entry billing system, where the billing system also uses the first designated third-party access management technology.

Systems according to the present disclosure enable the enterprise administrator to install an MDM agent on the users' electronic device(s) to implement these enterprise-wide access policies. While such electronic devices may be any of a wide variety of types of electronic devices, as described above, such access policy management first arose in the context of smartphones and laptops and is typically referred to as Mobile Device Management (MDM). This designation will be used in the present disclosure, but it should be understood that the concepts described may be used with fixed-location electronic devices as well as mobile electronic devices. As used herein, MDM refers to any suitable technology for providing management of users' electronic devices.

At start-up of the electronic device, the MDM agent identifies one or more applications that are allowed to access the cloud-based file storage server and associates it/them with an authenticator provided by the first third-party Identity Management (IdM) provider. Also at start-up, the MDM agent identifies an email application, associates it with an authenticator provided by the second third-party IdM provider, identifies a billing system application, and associates it with the first IdM authenticator.

Should, for example, the billing system provider change from the first access management technology to a third such technology, systems according to the disclosure enable the enterprise MDM administrator to notify the users' MDM agents of the change, download a third IdM authenticator used by the third access management technology, and force the billing application on its next attempt to access the billing system server to re-authenticate using the newly loaded IdM authenticator. Systems according to the disclosure enable the MDM agent to effect such changes on the fly or at the next device start-up.

FIG. 1 illustrates single sign-on framework software elements of an electronic device 100 according to the present disclosure. The device 100 includes a generic single sign-on framework (GSF) 102, applications 104 subject to access management policies dictated by the enterprise, an MDM agent 106, and identity provider (IdP) and/or IdM authenticator applications 108. One or more of these elements may utilize secure computing functionality 118 provided by the hardware and operating system of the electronic device 100.

The GSF 102 includes a GSF system services module 110, an application interface 112, an agent interface 114, and an authenticator interface 116. The GSF system services module 110 provides the generic single sign-on functionality of the present disclosure. The application interface 112 provides a standard protocol—or application programming interface (API)—for use by enterprise applications 104 in exchanging messages or procedure calls with the GSF 102. Such applications 104 are typically developed by independent software vendors (ISVs) or other third parties.

Similarly, the agent interface 114 provides a standard protocol for communications between an MDM agent and the GSF 102. The authenticator interface 116 provides a standard protocol for communications between the GSF 102 and IdP/IdM authenticators 108. The authenticators 108 may be implemented by ISVs as independent applications that engage in identification authentication exchanges with corresponding servers. Individual authenticators may use standard-based IdM technologies, such as Kerberos or Centrify, or vendor-proprietary technologies (denominated in FIG. 1 as "IdP X" and "IdP Y").

Embodiments according to the present disclosure support multiple SSO solutions and provide flexibility and improved usability to applications that use a single sign-on feature. By coding for the application interface 112, ISV application developers can leverage a single version of their application and be able to adopt multiple SSO solutions without code change or customization for various SSO solutions. In some embodiments, the application interface 112, agent interface 114, and authenticator interface 116 of the GSF 102 implement the GenericSSO standard. GenericSSO provides interfaces for easy configurability of settings by Mobile Device Management (MDM) administrators and agents.

The MDM agent application 106 can enroll SSO vendors and can whitelist applications for the enrolled SSO vendor. The MDM configurations are per user and protected by the userid of the application that sets the configuration for each user, where the application supports a multi-user model of the electronic device 100.

Where an operating system and/or hardware of the electronic device 100 provide security functionality, The GSF 102 may provide enhanced security and usability features by leveraging such device functionality. The access tokens that are obtained from SSO service provider packages via authenticators 108 may be stored under the protection of a secure storage memory. Such secure storage may be provided by TrustZone-based Integrity Measurement Architecture (TIMA) or other suitable security architecture. Configuration information provided to the GSF 102 by the MDM administrator (via the MDM agent 106) also may be protected against unwarranted manipulation by other applications.

Operation of the GSF 102 can be considered to be two fold. All calls received via the application interface 112 are processed by the GSF system service 110 and then routed via the authenticator interface 116 to an associated authenticator 108. This isolation allows all components to function independent of each other and independent of any GSF 102 changes. This design allows MDM administrators to configure any SSO provider for a user of the electronic device 100 without the applications 104 having to make changes every time a new SSO is configured. To achieve this, developers of MDM agents 106 are provided an API or other standard protocol for procedure calls to the GSF 102. The protocol is implemented in the agent interface 114.

An MDM configuration of applications and associated authenticators is applied per userID. Preferably, in the GSF 102, only one SSO solution will be enrolled in one container/persona. Therefore, the MDM configuration will be kept in each user space respectively. MDM is able to enroll SSO vendors and to whitelist applications that can make use of the SSO provider's services. When enrolling a SSO vendor, the corresponding authenticator will be checked for installation status and enrolled. Only the whitelisted applications are allowed to access APIs of the GSF 102. The authenticators 108 are independent light-weight SSO service applications that perform network- and protocol-based authentication functions. The authenticators 108 do not store internally any token-related data.

The GSF 102 fulfills many objectives of the single sign-on needs in the enterprise scenario. With the GSF 102, the electronic device 100 is able to support multiple SSO service providers. Firmware updates are no longer needed when a new SSO solution is added to the electronic device 100. The SSO solution of the GSF 102 is fully Plug-and-Play. The single sign-on is completely controlled by an MDM administrator and requires only a single version of a client application to call an API provided by the GSF 102 to obtain access tokens from a wide range of SSO service providers.

Through the GSF 102, interfaces may be provided to MDM administrators to control the SSO provider and whitelisted applications, and to manage access tokens obtained from the SSO providers. The GSF 102 also provides hardware-based protection to access tokens for increased security from malicious applications.

The GSF 102 may be beneficial to MDM administrators who, in many cases, wish to control SSO aspects of enterprise applications on the device. The MDM administrators can effectively couple enterprise apps with an active directory of the enterprise. This allows easy provisioning and unprovisioning of applications to users in an enterprise. The MDM administrators are also given implicit SSO service provider and account control privileges that are not available with other current SSO systems.

FIG. 2 illustrates hardware elements of an electronic device (ED) 100 for use in a single sign-on system according to the disclosure. The ED 100 in FIG. 2 is a portable device, however, it will be understood that in other embodiments of the disclosure, the electronic device 100 may be a non-portable device. As described above, the ED 100 may be any of a wide variety of types of electronic devices. The ED 100 may include a secure area suitable for providing generic single sign-on functionality, as shown and described with reference to FIGS. 1 and 3.

The ED 100 comprises core circuitry 200, which includes read-only memory (ROM) 205, random access memory (RAM) 210, central processing unit (CPU) 215, digital signal processor (DSP) 220, digital-to-analog converter (DAC)/analog-to-digital converter (ADC) circuitry 225, baseband (BB) circuitry block 230, codec circuitry block 235, radio frequency (RF) circuitry block 240, transmit (TX)/receive (RX) switch 245, and antenna 295.

In one embodiment, ROM 205 may store a boot-routine and other static data and RAM 210 may store an operating system (not shown), applications 212, and protocol stack 214. The ROM 205 and RAM 210 include a trusted execution environment or other secure area in which the confidentiality and integrity of code and data may be ensured. In an advantageous embodiment, ROM 205 and RAM 210 may comprise a single electronically erasable memory, such as a Flash memory, that is used in conjunction with a conventional RAM memory that is used to store dynamic data.

The ED 100 further comprises SIM card interface 250, USB interface 255, GPS receiver 260, Bluetooth (BT) transceiver 265, WiFi (or WLAN) transceiver 270, speaker and microphone circuitry block 275, keyboard 280, display 285, and camera 290. In some embodiment, keyboard 280 and display 285 may be implemented together as a touch screen display.

The CPU 215 is responsible for the overall operation of ED 100. In an exemplary embodiment, the CPU 215 executes applications 212 and protocol stack 214. CPU 215 runs the application layer and a wide variety of applications may be run in a smart phone implementation. Applications 212 may include audio, video, and image/graphics applications, in addition to applications related to embodiments of the present disclosure. CPU 215 may run applications 212 that support various audio formats such as MP3, MP4, WAV, and rm. CPU 215 may run image applications 212 that support JPEG image formats and video applications 212 that support video formats (e.g., MPEG-1 to MPEG-5). CPU 215 may support various operating systems (not shown), such as Symbian, java, android, RT-Linux, Palm, and the like. For time critical applications, CPU 215 runs a real-time operating system (RTOS). In addition to the physical layer, there are other layers, including protocol stack 214, that enable ED 100 to work with a network base station. In an exemplary embodiment, protocol stack 214 is ported on CPU 215.

DAC/ADC circuitry block 225 converts analog speech signals to digital signals, and vice versa, in GD 210. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 230 may be implemented as part of DSP 220, which executes many of the baseband processing functions (i.e., physical layer, Layer 1, or L1 functions). BB circuitry block 230 may be ported on DSP 220 to meet the latency and power requirements of GD 210. BB circuitry block 230 converts voice and data to be carried over the air interface to I/Q baseband signals.

BB circuitry block 230 may change from modem to modem for various air interface standards, such as GSM, CDMA, Wimax, LTE, HSPA, and others. BB circuitry block 230 is often referred to as the physical layer, or Layer 1, or L1. For mobile phones that work on GSM networks, the baseband part (Layer 1) running on DSP 220 and the protocol stack 214 running on CPU 215 are based on the GSM standard. For CDMA mobile phones, the Layer 1 and protocol stack 214 are based on the CDMA standard, and so on, for the LTE and HSPA standards-based mobile phones.

For speech or audio inputs, codec circuitry block 235 may compress and decompress the signal to match the data rate to the frame in which the data is sent. By way of example, codec circuitry block 235 may convert speech at an 8 KHz sampling rate to a 13 kbps rate for a full rate speech traffic channel. To do this, a residually excited linear predictive coder (RELP) speech coder may be which compresses 260 bits into a 20 ms. duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a viterbi decoder (used in receive path). Interleaving may be done for the data, which helps in spreading the error over time, thereby helping the receiver de-interleave and decode the frame correctly.

RF circuitry block 240 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 295 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of GD 210, antenna 295 may support different wire-area standards, including GSM, CDMA, LTE, and WiMAX, as well as short-range standards, including WiFi (WLAN), Bluetooth, and so on.

If antenna 295 comprises only one antenna used for both transmit and receive operations at different times, the TX/RX switch 245 couples both the transmit (TX) path and the receive (RX) path to antenna 295 at different times.

TX/RS switch 245 is controlled automatically by DSP 220 based on a GSM frame structure with respect to the physical slot allocated for that particular GSM mobile phone in both the downlink and the uplink. For frequency division duplexing (FDD) systems, TX/RX switch 245 may be implement as a diplexer that acts as filter to separate various frequency bands.

The ED 100 provides connectivity with laptops or other devices using WiFi (or WLAN) transceiver 270, BT transceiver 265, and universal serial bus (USB) interface 255. The ED 100 also uses GPS receiver 260 in applications 212 that require position information. If ED 100 is a conventional smart phone, applications 212 may include many popular applications, such as Facebook, Twitter, a browser, and numerous games that come pre-installed with GD 210.

Speaker and microphone circuitry block 275 comprises microphone circuitry (or mic) that converts acoustic energy (i.e., air pressure changes caused by speech or other sounds) to electrical signals for subsequent processing. Speaker and microphone 275 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

The ED 100 preferably includes camera 290. Presently, almost all mobile phones feature a camera module. Camera 290 may comprise a 12 megapixel, 14 megapixel, or even a 41 megapixel camera.

Display 285 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 280 may comprise a simple matrix type keypad that contains numeric digits (0 to 9), alphabetic characters (A to Z), special characters, and specific function keys. In a more advanced embodiment for a smart phone implementation, keypad 280 may be implemented in the mobile phone software, so that keyboard 280 appears on display 285 and is operated by the user using the touch of a finger tip.

BB circuitry block 230, RF circuitry block 240, TX/RX switch 245, WiFi (or WLAN) transceiver 270, BT transceiver 265, and USB interface 255 comprise a communications interface that enables the ED 100 to communicate either wired or wirelessly with PMDs 104 and RS 106.

According to the principles of the disclosure, applications 212 include a GSF 102, applications 104, an agent 106, and authenticators 108, as shown and described with reference to FIG. 1.

FIG. 3 illustrates a process 300 for a single sign-on function according to the disclosure. For clarity of presentation, the process 300 will be described as though performed by the ED 100 shown and described with reference to FIGS. 1 and 2. It will be understood that the process 300 may be performed by any suitable system for providing a generic single sign-on function.

In step 302, typically but not exclusively at start-up of the ED 100, the MDM agent 106 sends via the agent interface (or API) 114 one or more messages to the GSF 102 identifying one or more applications 104 and associated authenticators 108. One such message may identify a single application/authenticator pair, or may list a plurality of application/authenticator pairs.

While the MDM agent 106 sends application/authenticator pairs to the GSF 102 in a first step of exemplary process 300, in other embodiments, the MDM agent 106 may send such pairs to the GSF 102 at any time. When such a message is received, the GSF system service 110 determines whether the application of the newly received pair is already listed in the whitelist. If not, the GSF system service 110 stores the new application and its associated authenticator in the whitelist.

If, instead, the application is already listed in the whitelist, the GSF system service 110 stores in the whitelist the newly received authenticator as associated with the application, replacing the authenticator previously associated with the application. Further, the GSF system service 110 deletes from secure storage any access tokens generated for the application by the previous authenticator (described in greater detail below). In this way, subsequent application requests for an access token will result in a call to the new authenticator to generate a new access token.

In step 304, the GSF system service 110 processes the one or more messages by storing the identities of each application and its associated authenticator in a "whitelist." In this way, an MDM administrator, through use of the MDM agent 106, may select for all users in an enterprise the user applications that are cleared for access to enterprise server resources and which IdP/IdM authentication technology each application will use to obtain that access.

Subsequently, in step 306, a first application 104 sends via the application interface (or API) 112 a message requesting an access token for use in accessing a server. In step 307, the GSF system service 110 determines whether the first application is listed in the whitelist. If not, then (still as part of step 307) the GSF 102 sends a return message to the first application, where the message comprises a predefined message or response value indicating that the GSF 102 cannot fulfill the first application's request for an access token.

If the first application 104 is listed in the whitelist, then in step 308 the GSF system service 110 accesses a secure storage memory where it stores previously obtained access tokens (as described in greater detail below). If the GSF system service 110 determines that an access token has previously been obtained for the first application 104, the GSF system service 110 reads the access token from secure store and sends a reply message to the first application 104 via the application interface 112, the reply message comprising the stored access token.

If the GSF system service 110 determines that an access token has not previously been obtained for the first application 104, the GSF system service 110 identifies a first authenticator 108 associated in the whitelist with the first application. The GSF system service 110 then sends a message to the first authenticator 108 via the authenticator interface (or API) 116, the message requesting that the first authenticator obtain an access token for the first application to use in accessing the server.

In step 310, the first authenticator 108, interacts with a user of the ED 100 via user interface circuitry of the ED 100 to obtain credentials from the user. The credentials may be textual (e.g., userID and password) or biometric (e.g., fingerprint) or any other suitable format as required by the associated IdP/IdM authentication technology. Once the first authenticator 108 has obtained credentials for the user, then as part of an authentication transaction, the first authenticator sends the credentials to an associated server via a wired or wireless communication interface of the ED 100. If the server authenticates the user's credentials, then it returns to the first authenticator a first access token related to the user and the first application. The first authenticator then sends a reply message to the GSF 102 via the authenticator interface 116, the message comprising the first access token.

In step 312, the first authenticator sends a second message to the GSF 102, the message comprising user credential information related to the user's credentials. In response, the GSF system service 110 stores the user credential information in secure storage. In a preferred embodiment, the user credential information is stored in a TIMA secure storage.

In step 314, the GSF system service 110 stores the first access token received in step 310 in secure storage. In a preferred embodiment, the access token is stored in a TIMA secure storage. The GSF system service 110 then sends a reply message to the first application 104 via the application interface 112, the reply message comprising the first access token. In step 316, the first application 104 accesses the server using the first access token.

In step 318, a second application 104 sends a message to the GSF 102, the message requesting an access token. In step 319, the GSF system service 110 determines whether the second application 104 is listed in the whitelist. If not, the GSF system service 110 sends a reply message to the second application, the message comprising information indicating that the GSF 102 cannot provide an access token to the second application.

If the second application 104 is listed in the whitelist, then in step 320 the GSF system service 110 identifies an authenticator 108 associated in the whitelist with the second application. In the exemplary process 300, the second application is associated with the same first authenticator 108 with which the first application 104 is associated. The GSF system service 110 then sends a message to the first authenticator, the message requesting that the first authenticator obtain an access token for the second application to use in accessing the server.

In step 322, the first authenticator 108 determines that this is a second access token request and sends a message to the GSF 102 requesting the user credential information stored previously in step 312. The first authenticator uses the stored user credential information in a second authentication transaction to obtain a second access token, which it then sends to the GSF 102 in a reply message.

In step 324, the GSF system service 110 stores the second access token in the secure storage and sends the second access token to the second application 104 in a reply message. In step 326, the second application 104 accesses the server using the second access token.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure. Alternatively, the functionality herein may be implemented by as an Integrated Circuit (ID) or any combination of one or more processors and ICs.

Any such software may be stored in the form of volatile or non-volatile storage such as, for example, a storage device like a Read Only Memory (ROM), Random Access Memory (RAM), memory chips, device or integrated circuits or on an optically or magnetically readable medium such as, for example, a Compact Disk (CD), Digital Versatile Disk (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are not intended to limit the scope of the present disclosure. Accordingly, the scope of the present disclosure should be understood to include any and all modifications that may be made without departing from the technical spirit of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing generic single sign-on in an electronic device, the method comprising:
   receiving, by a device management agent on the electronic device, information identifying one or more applications;
   receiving, by the device management agent separately from the information identifying the one or more applications, one or more identity authenticators, wherein the identity authenticators are respectively associated to the identified applications, and wherein the identity authenticators are each independent applications that do not store token-related data;
   creating, by the device management agent, a whitelist of the identified applications and storing the identity authenticators;
   receiving from a first requesting application a first request for a first access token;
   if the first requesting application is listed in the whitelist, determining that a first identity authenticator, of the identity authenticators, is associated with the first requesting application;
   sending a second request for the first access token to the first identity authenticator;
   in response to the second request, receiving the first access token from the first identity authenticator; and
   sending the first access token to the first requesting application.

2. The method of claim 1, further comprising storing the first access token in secure storage.

3. The method of claim 2, further comprising:
   receiving information identifying a first application and a new identity authenticator associated to the first application;
   determining that the first application is listed in the whitelist and associated with a previous identity authenticator of the identity authenticators;

in response to so determining:
  in the whitelist, associating the first application with the new identity authenticator for the first application;
  removing from the secure storage any access token issued to the first application by the previous identity authenticator.

4. The method of claim 1, further comprising providing a standard protocol for use by a plurality of requesting applications in requesting access tokens.

5. The method of claim 1, further comprising, if the first requesting application is not listed in the whitelist, sending a predefined response to the first requesting application.

6. The method of claim 1, further comprising:
  receiving information identifying an additional application and an additional identity authenticator associated with the additional application; and
  adding the additional application to the whitelist and storing the additional identity authenticator.

7. The method of claim 1, further comprising:
  receiving from the first identity authenticator a request to store user credential information relating to a user of the electronic device; and
  storing the user credential information in secure storage.

8. The method of claim 7, further comprising:
  receiving from a second requesting application a third request for a second access token;
  if the second requesting application is found in the whitelist,
  determining that a second identity authenticator, of the identity authenticators, is associated with the second requesting application;
  sending a fourth request to the second identity authenticator;
  in response to a user credential information request from the second identity authenticator, sending the stored user credential information to the second identity authenticator;
  in response to the fourth request, receiving the second access token from the second identity authenticator; and
  sending the second access token to the second requesting application.

9. The method of claim 7, further comprising providing a standard procedure call protocol for use by the identity authenticators in at least one of sending requests for access tokens to the first identity authenticator and receiving, from the first identity authenticator, requests to store user information.

10. An electronic device providing generic single sign-on functionality, the electronic device comprising:
  a memory comprising a plurality of applications, the applications comprising an application interface, an agent interface, an authenticator interface, and a system service module; and
  a processor configured to execute one or more of the plurality of applications in the memory,
  wherein:
  the application interface is configured to exchange one or more application interface messages with the plurality of applications;
  the agent interface is configured to receive one or more agent messages from an agent application;
  the authenticator interface is configured to exchange one or more authentication messages with a plurality of identity authenticators; and
  the system service module is configured to:
    receive the one or more agent messages via the agent interface, each agent message identifies one or more applications and separately provides identity authenticators respectively associated to the identified applications, the identity authenticators each being an independent application that do not store token-related data;
    create a whitelist of the one or more identified applications and store the identity authenticators;
    receive a first access token request message from a first requesting application via the application interface;
    determine whether the first requesting application is one of the identified applications listed in the whitelist; and
    if the first requesting application is not listed in the whitelist, send a predefined response message to the first requesting application via the application interface.

11. The electronic device of claim 10, wherein the system service module is further configured to:
  if the first requesting application is listed in the whitelist, determine that a first identity authenticator, of the identity authenticators, is associated with the first requesting application;
  send a second access token request message to the first identity authenticator via the authenticator interface;
  receive a first access token from the first identity authenticator via the authenticator interface; and
  send the first access token to the first requesting application via the application interface.

12. The electronic device of claim 11, wherein the system service module is further configured to store the first access token in secure storage.

13. The electronic device of claim 12, wherein the system service module is further configured to:
  receive a message via the agent interface, the message identifying a first application and an new identity authenticator associated to the first application;
  determine whether the first application is listed in the whitelist and associated with a previous identity authenticator of the identity authenticators;
  if the first application is so listed in the whitelist:
    associate the first application with the new identity authenticator;
    remove from the secure storage any access token issued to the first application by the previous identity authenticator.

14. The electronic device of claim 11, wherein the application interface is configured to provide a standard protocol for use by a plurality of requesting applications in requesting access tokens.

15. The electronic device of claim 11, wherein the system service module is further configured to:
  receive a message via the agent interface, the message identifying an additional application and an additional identity authenticator associated with the additional application; and
  add the additional application to the whitelist and store the additional identity authenticator.

16. The electronic device of claim 11, wherein the system service module is further configured to:
  receive a message from the first identity authenticator via the authenticator interface, the message comprising a request to store user credential information relating to a user of the electronic device; and
  store the user credential information in secure storage.

17. The electronic device of claim 16, wherein the system service module is further configured to:
  receive a third access token request from a second requesting application via the application interface;

if the second requesting application is listed in the whitelist,
determine that a second identity authenticator, of the identity authenticators, is associated with the second requesting application;
send a fourth access token request to the second identity authenticator via the authenticator interface;
in response to receiving a user credential information request from the second identity authenticator via the authenticator interface, send the stored user credential information to the second identity authenticator via the authenticator interface;
receive a second access token from the second identity authenticator via the authenticator interface; and
send the second access token to the second requesting application via the application interface.

18. A non-transitory computer readable medium comprising a plurality of instructions for a generic single sign-on that, when executed by a processor of an electronic device, causes the electronic device to:
receive, by a device management agent on the electronic device, information identifying one or more applications;
receiving, by the device management agent separately from the information identifying the one or more applications, one or more identity authenticators, wherein the identity authenticators are respectively associated to the identified applications, and wherein the identity authenticators are each independent applications that do not store token-related data;
create, by the device management agent, a whitelist of the identified applications and store identity authenticators;
receive, by a system service module, from a first requesting application a first request for a first access token;
if the first requesting application is listed in the whitelist, determine, by the system service module, that a first identity authenticator, of the identity authenticators, is associated with the first requesting application;
send, by the system service module, a second request for the first access token to the first identity authenticator;
in response to the second request, receive by the system service module the first access token from the first identity authenticator; and
send the first access token to the first requesting application.

\* \* \* \* \*